United States Patent [19]

Bitter

[11] Patent Number: 4,628,873
[45] Date of Patent: Dec. 16, 1986

[54] MOTOR VEHICLE WITH INTAKE MANIFOLD SYSTEM

[75] Inventor: Rudolf Bitter, Russelsheim, Fed. Rep. of Germany

[73] Assignee: General Motors Corporation, Detroit, Mich.

[21] Appl. No.: 749,061

[22] Filed: Jun. 26, 1985

[30] Foreign Application Priority Data

Jul. 17, 1984 [DE] Fed. Rep. of Germany ....... 3426266

[51] Int. Cl.⁴ .......................................... F02M 35/10
[52] U.S. Cl. ................................................ 123/52 M
[58] Field of Search ........... 123/52 M, 52 MB, 188 M

[56] References Cited

U.S. PATENT DOCUMENTS

| | | | |
|---|---|---|---|
| 4,116,172 | 9/1978 | Löhr et al. | 123/52 M |
| 4,254,746 | 3/1981 | Chiba et al. | 123/52 M |
| 4,354,458 | 10/1982 | Bury | 123/52 M |

FOREIGN PATENT DOCUMENTS

| | | | |
|---|---|---|---|
| 2339356 | 2/1978 | Fed. Rep. of Germany. | |
| 2345930 | 8/1978 | Fed. Rep. of Germany. | |
| 1343717 | 10/1963 | France | 123/52 M |
| 0052522 | 5/1981 | Japan | 123/52 M |

*Primary Examiner*—Willis R. Wolfe, Jr.
*Attorney, Agent, or Firm*—Robert J. Outland

[57] ABSTRACT

In a motor vehicle having an engine intake manifold system, a plenum from which individual intake conduits extend to the cylinders of the engine is mounted to a portion of the vehicle structure, such as the firewall of the vehicle body. This enables the use of straight, relatively long intake manifold pipes, an arrangement which increases engine efficiency and which yields higher torque values at low engine speeds.

5 Claims, 2 Drawing Figures

MOTOR VEHICLE WITH INTAKE MANIFOLD SYSTEM

TECHNICAL FIELD

This invention relates to a motor vehicle equipped with an engine having at least one cylinder row and an intake manifold system including a plenum shared by a plurality of cylinders, and wherein a plurality of intake conduits are disposed between the plenum and the inlet ports in the cylinder head. A motor vehicle of this type has been described, for instance, in German DE-OS No. 23 39 356.

BACKGROUND

Due to increased fuel costs and more stringent engine emission standards, efforts towards reducing fuel consumption while retaining the existing levels of vehicle performance have been intensified in the recent past. One common approach towards achieving this objective has been to increase the drive axle ratio, a procedure which allows the engine to be run at lower speeds and which results in lower fuel consumption. One inherent drawback with the approach of increasing the drive axle ratio while using an engine of the same general layout is that the available torque in the lower engine speed range is often insufficient. As a result, the vehicle is often driven in lower gears, which will nullify the fuel economy advantage that is being sought.

In an effort to increase engine efficiency, it has been proposed in the aforementioned German DE-OS No. 23 39 356 to provide relatively long intake conduits between the plenum and the intake ports of the cylinders. In this prior-art engine, the plenum is disposed on top of the cylinder head cover. The individual intake conduits extend along arcuate paths from the plenum to the lateral intake ports of the cylinders and are therefore relatively long. A shortcoming of this arrangement is that the intake conduits are of arc-shaped configuration and that, as a result, the flow losses are relatively great. Furthermore, since the plenum in this prior-art intake manifold system is mounted on top of the cylinder head cover, the freedom of arranging the individual intake conduits is severely restricted, so that tuning of the gas flow oscillations is feasible only to a very limited degree.

In order to keep the flow losses in the individual intake conduits relatively low, it has been common practice to employ intake conduits that extend in a straight line, as disclosed in German patent DE-PS No. 23 45 930. In an arrangement of this type, the individual intake conduits are used to support the plenum. However, because of space and stability considerations, such a design precludes the use of longer intake pipes, a feature which is very desirable if engine efficiency is to be improved.

SUMMARY OF THE INVENTION

It is an object of the present invention to provide a motor vehicle of the type described in the foregoing which permits, at relatively low cost, the use of longer intake conduits so that the flow losses are relatively small.

To this end, the invention provides an arrangement in which the plenum is mounted independently from the engine on a member of the vehicle body.

This arrangement permits the use of intake pipes of adequate length so as to achieve optimum gas oscillating conditions and to thereby increase to a considerable extent the available torque at low engine speeds. As a result, the vehicle can be operated at relatively low engine speeds which, apart from the advantage of lower fuel consumption, yields the added benefit of lower exhaust and noise emissions. Other advantages to be gained by the novel arrangement are increased engine performance as well as cost savings, especially due to simplification of assembly and the capability to adopt the modular type construction method. Last but not least, the manifold arrangement according to the invention makes it easier to adapt to the installation conditions in the engine compartment.

Preferably, the intake pipes extend at a straight line to keep the flow losses as low as possible.

Since the engine vibrates relative to the vehicle body, positional displacements between the engine and the plenum will take place. To compensate for such displacements, the invention proposes that the individual intake pipes be rigidly connected with the engine housing, and that each intake pipe terminates at the plenum in a bellows.

In vehicles equipped with transversely mounted engines, the plenum may be mounted on the firewall of the vehicle body, because this is a place where the plenum can easily be fastened in a vehicle of this type.

For the same reasons, in vehicles that have their engines mounted longitudinally, the most suitable arrangement is to fasten the plenum to one of the front wheel housings.

It should be realized that a variety of arrangements may be utilized in the practice of the invention. To convey the principal concept of the invention, one arrangement is illustrated in the drawings and is described in the following specifications.

BRIEF DRAWING DESCRIPTION

In the drawings:

FIG. 1 is a perspective view of a portion of a motor vehicle compartment that is relative to the invention; and FIG. 2 is a longitudinal sectional view through a similar arrangement, and the view is rendered to some extent schematically.

DETAILED DESCRIPTION

Figure 1:
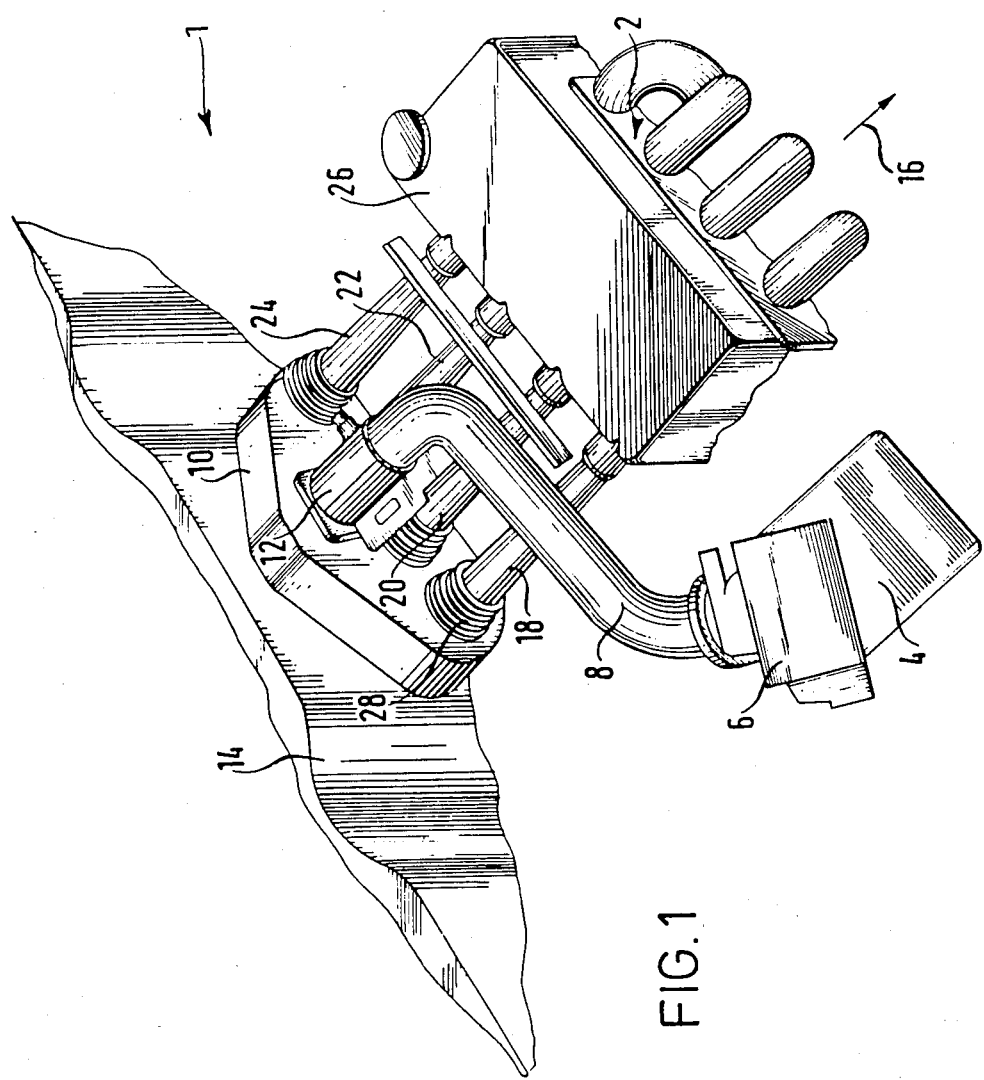

FIG. 1 shows a motor vehicle 1 mounting a four-cylinder inline engine 2 and an intake air filter 4. Air which is drawn into the engine through the filter 4 travels via an air volume measuring device 6 and a hose 8 to a plenum 10 through a throttle valve body 12 which is attached to the plenum 10. The plenum 10 is attached, in a manner not shown in detail, rigidly to a firewall 14 which forms a portion of the body structure of the motor vehicle 1. The direction of forward vehicle movement is indicated by arrow 16.

Four air intake conduits 18, 20, 22, 24 are provided which extend from the plenum 10 to the engine cylinder head identified by the numeral 26. In order to enable relative movement between the engine 2 and the plenum 10 mounted on the firewall 14, the individual intake conduits 18, 20, 22, 24 terminate at the plenum in respective flexible bellows, one of which is designated by the numeral 28.

Figure 2:
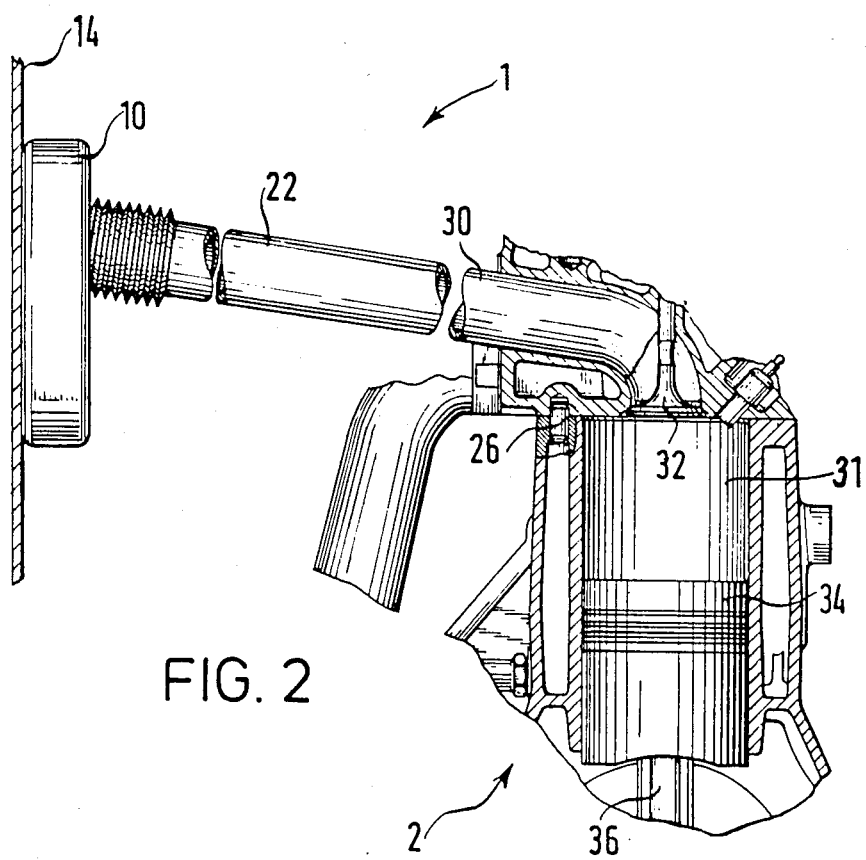

FIG. 2 illustrates the engine 2 as well as the plenum 10 which is mounted to the firewall 14. Using the intake conduit 22 as an example, FIG. 2 more clearly than FIG. 1 shows how the individual air conduits extend to respective intake ports, in this instance intake port 30 in the cylinder head 26. For a better understanding of the over-all arrangement, FIG. 2 also illustrates schematically an engine cylinder 31 and its associated intake valve 32, piston 34 and connecting rod 36.

I claim:

1. In a motor vehicle having a body and an internal combustion engine including a performance tuned intake manifold system comprising an enlarged plenum shared by a plurality of engine cylinders and a plurality of long air intake conduits extending individually between the plenum and intake ports connecting with the cylinders, the improvement wherein to provide room for the long intake conduits the plenum is rigidly mounted, independently of the engine, on a portion of the vehicle body spaced from the engine.

2. In a motor vehicle according to claim 1 wherein the engine is mounted traverse and the body includes a firewall longitudinally spaced from the engine, the further improvement wherein the plenum is mounted on the firewall of the vehicle body.

3. In a motor vehicle according to claim 1 wherein the engine is mounted longitudinally and the body includes wheel housing spaced laterally from the engine, the further improvement wherein the plenum is mounted on one of the wheel housings of the vehicle body.

4. In a motor vehicle according to claim 1, the further improvement wherein to accommodate motion between the engine and vehicle body the intake conduits are rigidly connected to the intake ports and each intake conduit terminates in a bellows at the plenum.

5. In a motor vehicle according to claim 4, the further improvement wherein to maximize flow efficiency the intake conduits extend in straight lines.

* * * * *